(12) United States Patent  
Misumi et al.

(10) Patent No.: US 8,385,907 B2
(45) Date of Patent: Feb. 26, 2013

(54) COMMUNICATION SYSTEM, AND COMMUNICATION DEVICE AND PHONE DEVICE FOR THE SAME

(75) Inventors: Kazuhito Misumi, Aichi-ken (JP); Sayaka Taniguchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 8 days.

(21) Appl. No.: 13/072,707

(22) Filed: Mar. 26, 2011

(65) Prior Publication Data
US 2011/0244848 A1 Oct. 6, 2011

(30) Foreign Application Priority Data
Mar. 31, 2010 (JP) ................................. 2010-082352

(51) Int. Cl.
*H04W 4/00* (2009.01)
(52) U.S. Cl. .................... 455/422.1; 455/426.1
(58) Field of Classification Search .................. 455/410, 455/411, 413, 414.1, 415, 426.1, 422.1
See application file for complete search history.

(56) References Cited

U.S. PATENT DOCUMENTS

| 2003/0148760 A1 | 8/2003 | Takayanagi |
| 2003/0219002 A1 | 11/2003 | Kishida |
| 2008/0298603 A1* | 12/2008 | Smith ............................. 381/67 |

FOREIGN PATENT DOCUMENTS

| JP | 2002-077022 A | 3/2002 |
| JP | 2003037545 A | 2/2003 |
| JP | 2003-249973 A | 9/2003 |
| JP | 2006-0333360 A | 12/2006 |

* cited by examiner

*Primary Examiner* — Sam Bhattacharya
(74) *Attorney, Agent, or Firm* — Baker Botts L.L.P.

(57) ABSTRACT

A communication system switches a communication state from a first communication state where a wireless communication unit of a communication device performs data communication and voice communication with an external device and a phone device to a second communication state to perform the data communication between the phone device and the external device, in response to electric power supply to the wireless communication unit being interrupted. The first communication state is set with a communication-device network ID used for the communication device and a phone-device network ID used for the phone device. The second communication state is set with the phone-device network ID used for the communication device and the communication-device network ID used for the phone device.

9 Claims, 9 Drawing Sheets

COMMUNICATION SYSTEM, AND COMMUNICATION DEVICE AND PHONE DEVICE FOR THE SAME

CROSS-REFERENCE TO RELATED APPLICATION

This application claims priority under 35 U.S.C. §119 from Japanese Patent Application No. 2010-082352 filed on Mar. 31, 2010. The entire subject matter of the application is incorporated herein by reference.

BACKGROUND

1. Technical Field

The following description relates to one or more communication systems configured to perform wireless voice communication and wireless data communication.

2. Related Art

A communication device has been known, which includes a base phone for a digital cordless phone and a wireless local area network (WLAN). Further, a technique has been known, in which a wireless terminal device communicates with an access point via the WLAN of the communication device. Thereby it is possible to connect the wireless terminal device with an external network. In addition, a communication device has been known, which is provided with a power-saving mode and/or a power-off mode to save electric power consumption in a standby state.

SUMMARY

When the wireless terminal device communicates with the access point via the WLAN of the communication device, the communication between the wireless terminal device and the access point has to be maintained even though the communication device is set into the power-saving mode or the power-off mode. In this case, since it is impossible to stop supplying an electric power to a circuit that controls the VA/LAN of the communication device, it is difficult to adequately save the electric power consumption of the communication device.

Aspects of the present invention are advantageous to provide one or more improved techniques that make it possible to overcome the above problem.

According to aspects of the present invention, a communication system is provided, which includes a communication device connected with a communication line and a phone device. The communication system connects the communication device and the phone device with each other in a wireless communication. The communication device includes a wireless communication unit configured to wirelessly perform data communication and voice communication with an external device and the phone device, and a communication-device storage unit configured to store a communication-device network ID for identifying the communication device and a phone-device network ID for identifying the phone device. The phone device includes a phone-device storage unit configured to store the phone-device network ID and the communication-device network ID. The communication system is configured to switch a communication state thereof from a first communication state to a second communication state in response to electric power supply to the wireless communication unit being interrupted. The first communication state, in which the wireless communication unit performs the data communication and the voice communication with the external device and the phone device, is set when the communication-device network ID is used for the communication device such that the communication device is identified as the communication device on the communication system, and the phone-device network ID is used for the phone device such that the phone device is identified as the phone device on the communication system. The second communication state, in which the data communication is performed between the phone device and the external device, is set when the phone-device network ID is used for the communication device such that the communication device is identified as the phone device on the communication system, and the communication-device network ID is used for the phone device such that the phone device is identified as the communication device on the communication system.

According to aspects of the present invention, further provided is a communication device configured to be connected with a communication line and wirelessly communicate with a phone device. The communication device includes a wireless communication unit configured to wirelessly perform data communication and voice communication with an external device and the phone device, a communication-device storage unit configured to store a communication-device network ID for identifying the communication device and a phone-device network ID for identifying the phone device, and a communication-device controller configured to selectively set one of the communication-device network ID and the phone-device network ID as a network ID for the communication device. The communication-device controller is configured to switch a communication state from a first communication state to a second communication state in response to electric power supply to the wireless communication unit being interrupted. When the communication-device controller sets the communication-device network ID as the network ID for the communication device, the first communication state is set, in which the wireless communication unit performs the data communication and the voice communication with the external device and the phone device. When the communication-device controller sets the phone-device network ID as the network ID for the communication device and the wireless communication unit sends to the phone device a command for setting the communication-device network ID as the network ID for the phone device, the second communication state is set, in which the data communication is performed between the phone device and the external device.

According to aspects of the present invention, further provided is a phone device configured to wirelessly communicate with a communication device connected with a communication line. The phone device includes a phone-device storage unit configured to store a phone-device network ID for identifying the phone device and a communication-device network ID for identifying the communication device, and a phone-device controller configured to selectively set one of the communication-device network ID and the first-phone-device network ID as network ID for the phone device. The phone-device controller is configured to switch a communication state from a first communication state to a second communication state in response to receipt of a notification that electric power supply to a wireless communication unit of the communication device is interrupted. When the phone-device controller sets the phone-device network ID as the network ID for the phone device, the first communication state is set, in which voice communication is performed between the phone device and the wireless communication unit. When the phone-device controller sets the communication-device network ID as the network ID for the phone device, the second communication state is set, in which data communication is performed between the phone device and an external device that is configured to wirelessly communicate with a device identified with the communication-device network ID.

BRIEF DESCRIPTION OF THE ACCOMPANYING DRAWING

FIG. 1 exemplifies a configuration of a communication system in an embodiment according to one or more aspects of the present invention.

Figure 7:
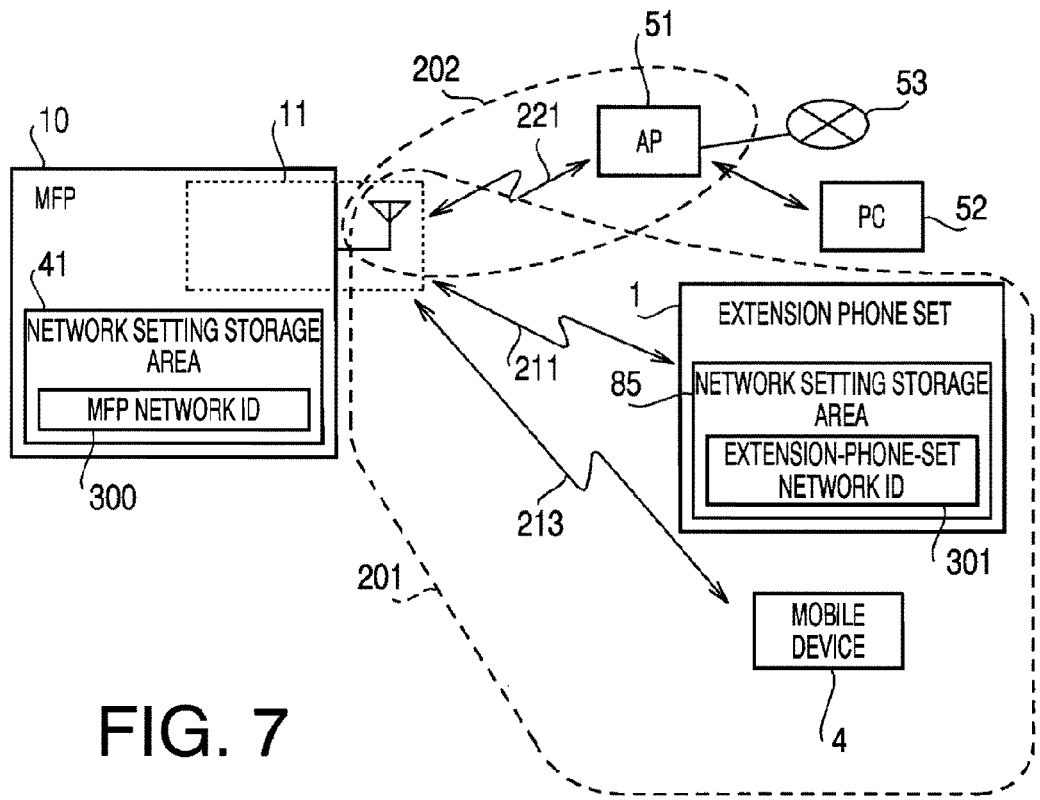

FIG. 7 schematically illustrates the first communication state in the embodiment according to one or more aspects of the present invention.

Figure 8:
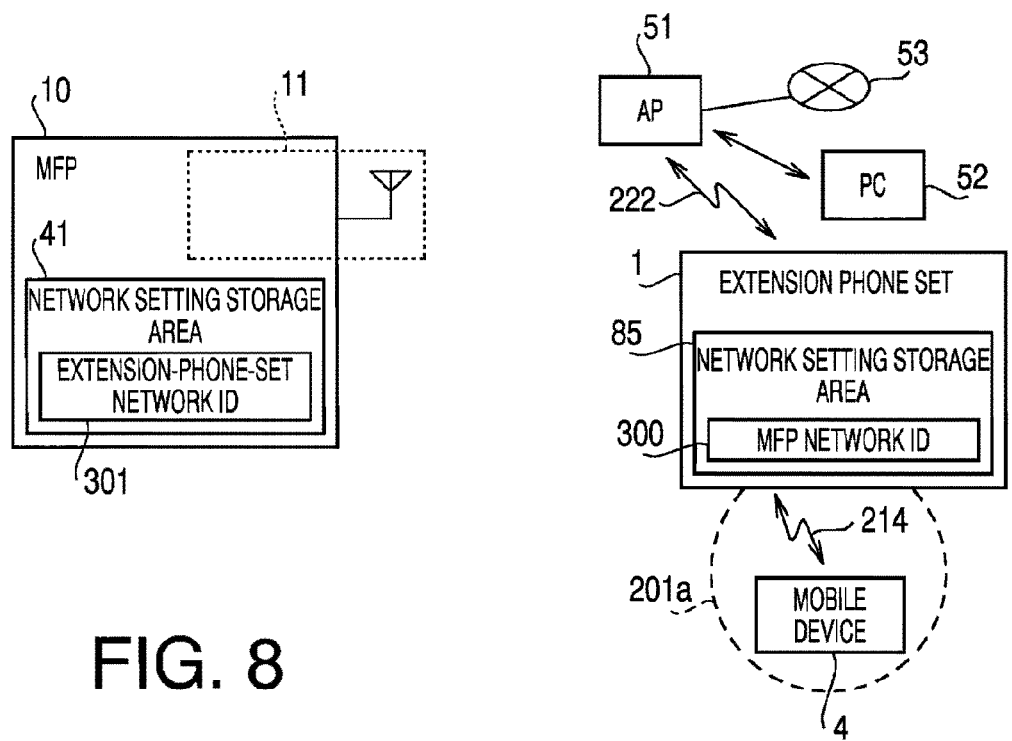

FIG. 8 schematically illustrates the second communication state in the embodiment according to one or more aspects of the present invention.

Figure 9:
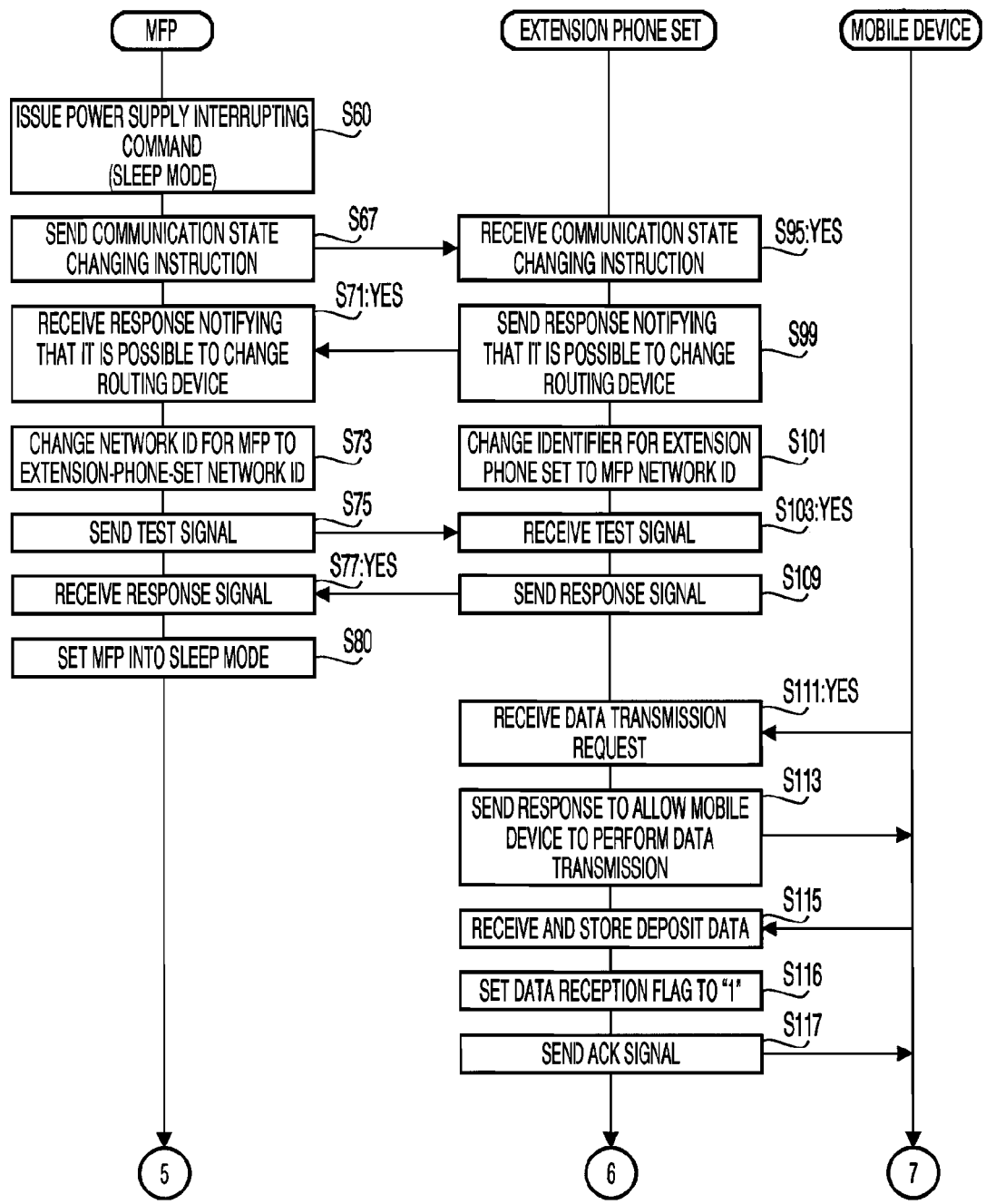
Figure 10:
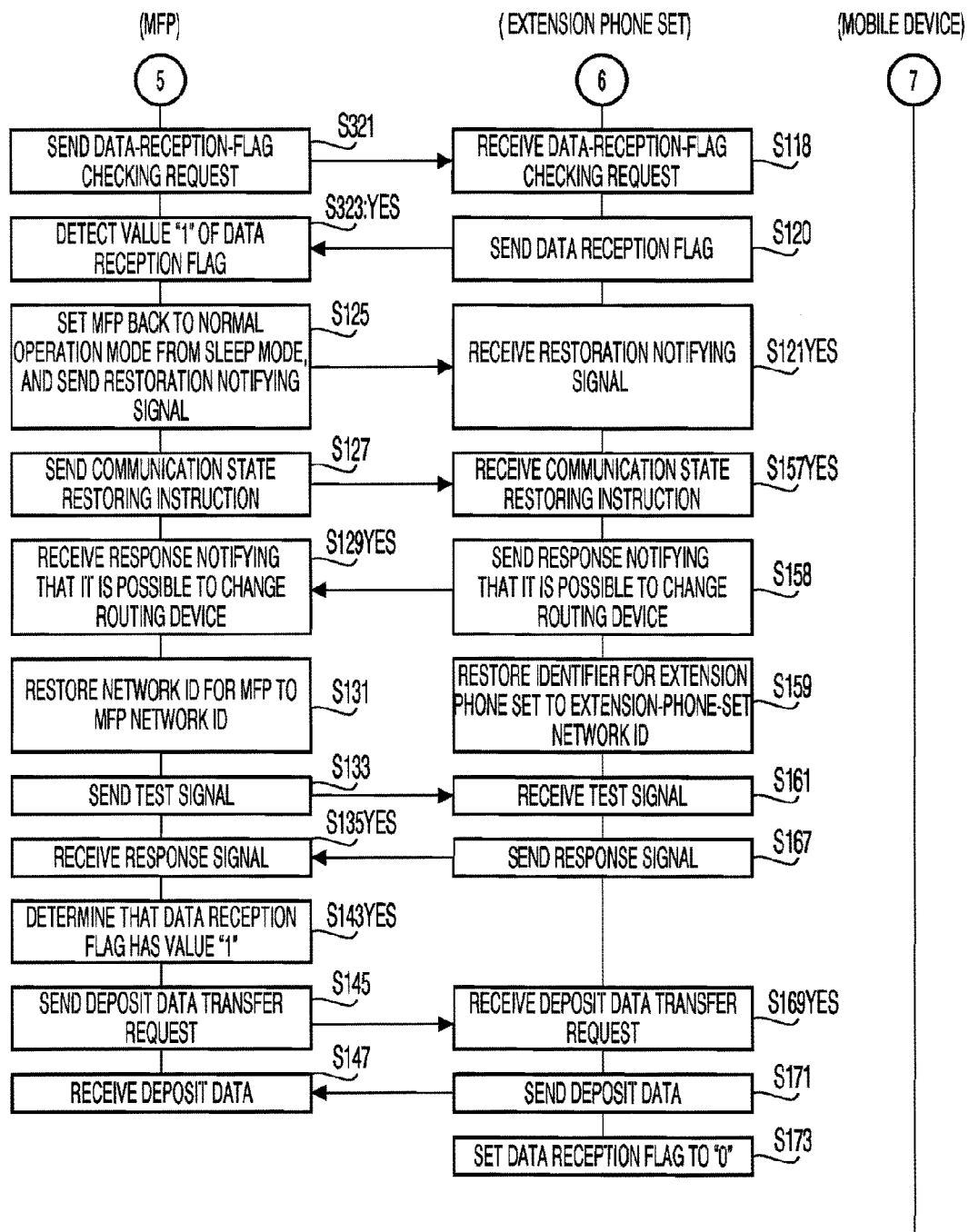

FIGS. 9 and 10 are sequence charts exemplifying a procedure of operations performed in the communication system in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect, Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
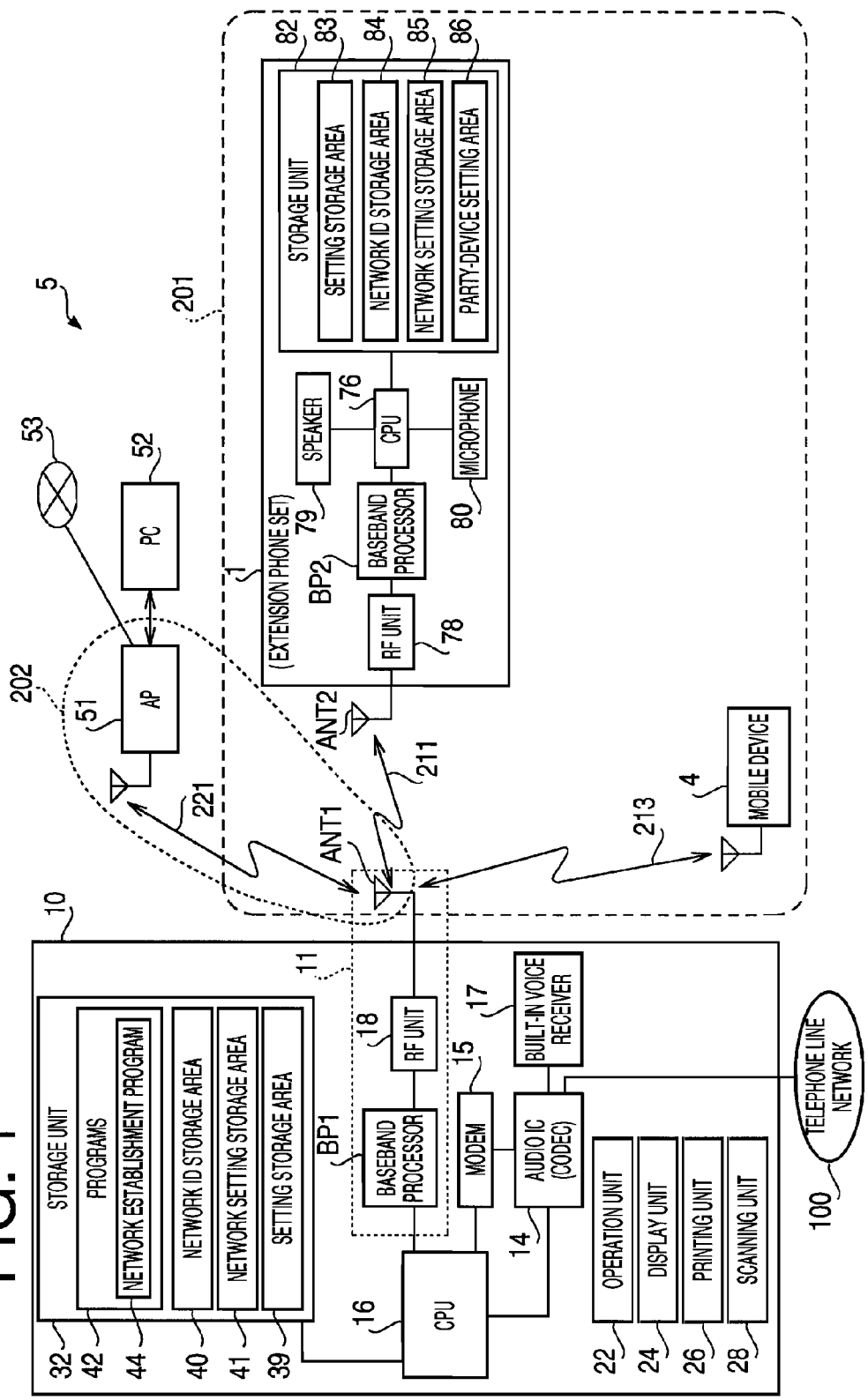

As shown in FIG. 1, a communication system 5 of an embodiment according to aspects of the present invention includes a multi-function peripheral (MIT) 10, an access point (AP) 51, a personal computer (PC) 52, an extension phone set 1, and a mobile device 4. A wireless personal area network (WPAN) 201 and a wireless local area network (WLAN) 202 are formed to be connected with the MFP 10, It is noted that each of the WPAN 201 and the WLAN 202 may be established, e.g., based on a communication method complying with one of the standards IEEE 802.11 a/b/g.

The AP 51 is a known relay device configured to perform data communication of a data signal via the WLAN 202. The data signal is re-transmitted in the case of a communication error. For instance, as an example of the data signal, cited is print data based on which the MFP 10 perform printing. Further, the AP 51 is configured to transmit the data signal to the PC 52 or receive the data signal from the PC 52. In other words, the data communication of the data signal is performed between the MFP 10 and the PC 52 via the AP 51. Further, the AP 51 is linked with an Internet 53.

The extension phone set 1 is configured to perform wireless communication 211 of an audio signal via the WPAN 201. The audio signal is a signal for performing voice communication. The audio signal is not re-transmitted in the case of a communication error, and is required to be transmitted on a real-time basis.

The mobile device 4 is a known device configured to perform wireless communication 213 of the data signal via the WPAN 201. In addition, the MFP 10 has a function of a routing device (i.e., a device for selecting an information transmission channel in the communication system 5). Therefore, the mobile device 4 is connectable to the Internet 53 via the MFP 10 and the AP 51.

The MFP 10 includes a CPU 16, a storage unit 32, a wireless communication control circuit 11, an audio IC 14 (CODEC), a modem 15, a built-in voice receiver 17, an operation unit 22, a display unit 24, a printing unit 26, and a scanning unit 28. The above elements included in the MFP 10 are communicably connected with each other. The CPU 16 performs various processes in accordance with programs 42 stored on the storage unit 32. Further, the CPU 16 takes various controls for the storage unit 32, the wireless communication control circuit 11, and the audio IC 14.

The storage unit 32 stores the programs 42, which include basic programs (not shown), and a network establishment program 44. The basic programs include a program for controlling a sleep timer to operate, a program for controlling the printing unit 26 to perform a printing operation, and a program for controlling the scanning unit 28 to perform a scanning operation. The network establishment program 44 is a program for switching between a first communication state and a second communication state. It is noted that the first and second communication states will be described later.

It is noted that the storage unit 32 is configured with a combination of at least two of a RAM, a ROM, a flash memory, and a hard disk drive (HDD). The storage unit 32 includes a setting storage area 39, a network ID storage area 40, and a network setting storage area 41. The setting storage area 39 is an area to store various settings such as an initial count value "X."

The network ID storage area 40 stores an MFP network ID 300 and an extension-phone-set network ID 301. The MFP network ID 300 is information for identifying the MFP 10 on a network, and includes an MFP-MAC address and an MFP-IP address. Additionally, the extension-phone-set network ID 301 is information for identifying the extension phone set 1 on a network, and includes a extension-phone-set MAC address and a extension-phone-set IP address. The network setting storage area 41 is configured to store an identifier for the MFP 10. When the MFP network ID 300 is stored in the network setting storage area 41, the MFP 10 is recognized as the MFP 10 by the other devices on the communication system 5. Meanwhile, when the extension-phone-set network ID 301 is stored in the network setting storage area 41, the MFP 10 is recognized as the extension phone set 1 by the other devices on the communication system 5.

The wireless communication control circuit 11 includes a baseband processor BP1, an RF unit 18, and an antenna ANT1. The baseband processor BP1 is a circuit configured to control the wireless communication control circuit 11 as a whole. The RF unit 18 is a circuit configured to perform signal communication with the antenna ANT1 The audio IC 14 (CODEC) is configured to perform data encoding and data decoding. Further, the audio IC 14 selects one of the modem 15 and the built-in voice receiver 17 that is to be connected with a telephone line network 100. The modem 15 is configured to control communication of an audio signal with the telephone line network 100. The operation unit 22 includes a plurality of buttons for accepting an input from a user. The display unit 24 is configured to display various kinds of information. The scanning unit 28 is configured to read a document and create scanned data based on the read document. The printing unit 26 is configured to print, on a sheet, print data received from an external device (e.g., the PC 52) and the scanned data created by the scanning unit 28.

The extension phone set 1 includes a CPU 76, a baseband processor BP2, an RE unit 78, a speaker 79, a microphone 80, a storage unit 82, and an antenna ANT2. The CPU 76 is configured to take various sorts of controls for the storage unit 82 and the baseband processor BP2. The storage unit 82 includes a setting storage area 83, a network ID storage area 84, a network setting storage area 85, and a party-device setting area 86. The setting storage area 83 stores various parameters such as a data reception flag. The network ID storage area 84 stores the MFP network ID 300 and the extension-phone-set network ID 301. The network setting storage area 85 is an area to store an identifier for the extension phone set 1. When the extension-phone-set network ID 301 is stored in the network setting storage area 85, the extension phone set 1 is recognized as the extension phone set 1 by the other devices on the communication system 5. Meanwhile, when the MFP network ID 300 is stored in the network setting storage area 85, the extension phone set 1 is recognized as the MFP 10 by the other devices on the communication system 5. The party-device setting area 86 is an area to store a network ID of a device that is set as a party device of the extension phone set 1. A device on the communication system 5, with which the extension phone set 1 is to communicate, is determined based on a network ID stored in the party-device setting area 86. The speaker 79 is configured to output sound data received from the wireless communication control circuit 11. The microphone 80 is configured to acquire sound data. Since other configurations of the extension phone set 1 are the same as those of the MFP 10, detailed explanation about them will be omitted.

The communication system 5 has two communication states, i.e., the first communication state and the second communication state. The first communication state is a state where the NUT 10 forms the WPAN 201 and serves as the routing device. Meanwhile, the second communication state is a state where the extension phone set 1 forms the WPAN 201a and serves as the routing device. The first communication state will be described with reference to FIG. 7. In the first communication state, the MFP network ID 300 is used as an identifier for the MFP 10. Therefore, the MFP 10 is recognized as the MFP 10 on the communication system 5. Further, the extension-phone-set network ID 301 is used as an identifier for the extension phone set 1. Therefore, the extension phone set 1 is recognized as the extension phone set 1 on the communication system 5.

In the first communication state, the WPAN 201 and the WLAN 202 are established by the wireless communication control circuit 11. The WPAN 201 is connected with a plurality of communication terminal devices (e.g., the extension phone set 1 and the mobile device 4). Through the WPAN 201, the wireless communication 211 of the audio signal is performed between the wireless communication control circuit 11 and the extension phone set 1. Further, through the WPAN 201, the wireless communication 213 of the data signal is performed between the wireless communication control circuit 11 and the mobile device 4. The wireless communications 211 and 213 can be performed in parallel. The WLAN 202 is connected with the AP 51. Through the WLAN 202, the wireless communication 221 of the data signal is performed between the wireless communication control circuit 11 and the AP 51, Namely, in the first communication state, the single wireless communication control circuit 11 realizes two kinds of communications, i.e., the voice communication with the extension phone set 1 and the data communication with the mobile device 4.

The WPAN 201 and the WLAN 202 are concurrently available. For instance, the WPAN 201 and the WLAN 202 are concurrently available using a time division multiple access (TDMA) method. In the TDMA, a carrier frequency used for transmission is divided into units which are referred to as time slots, such that a plurality of users can share the same frequency channel to perform their respective communications. In the embodiment, time slots are assigned to the WPAN 201 and WLAN 202, so as to establish multiple wireless connections. It is noted that the expression "the WPAN 201 and the WLAN 202 are concurrently available" in this case provides a meaning that communication using the WPAN 201 and communication using the WLAN 202 are executable in parallel during the same period of time. However, the expression is not limited to a meaning that a packet transmitted from the WPAN 201 and a packet transmitted from the WLAN 202 can be received at the same moment.

To make the wireless communication control circuit 11 serve as a circuit to establish the WPAN 201, for instance, a method using a function of Wi-Fi Direct, which the Wi-Fi Alliance proposes, may be applied. Thereby, the wireless communication control circuit 11 is made function as a server for Wi-Fi Direct. Alternatively, a method using a function of My WiFi Technology, which Intel (trademark registered) proposes, may be applied to make the wireless communication control circuit 11 serve as a circuit to establish the WPAN 201.

Further, in the WPAN 201, it is monitored whether there is a wireless communication device connectable to the WPAN 201 in a communication area where communication using the WPAN 201 is feasible. When a connectable communication device is newly detected, the newly-detected communication device is connected to the WPAN 201 via wireless communication so as to dynamically establish a network in the WPAN 201. It is noted that the extension phone set 1 may always be connected with the WPAN 201. Thereby the user can use the extension phone set 1 as if the extension phone set 1 were a normal cordless phone, without having to care about the presence of a dynamically-established network.

The second communication state will be described with reference to FIG. 8. In the second communication state, the network IDs used as the identifiers are interchanged between the MIT 10 and the extension phone set 1. Specifically, the extension-phone-set network ID 301 is used as the identifier for the MFP 10. Further, the MFP network ID 300 is used as the identifier for the extension phone set 1. Hence, the MFP 10 is recognized as the extension phone set 1 on the communication system 5. Further, the extension phone set 1 is recognized as the MFP 10 on the communication system 5.

A case where the communication state is switched from the first communication state to the second communication state will be described. In the second communication state, the mobile device 4 and the AP 51 maintain the data communication with a device that uses the MIT network ID 300 as an identifier therefor. However, in the second communication state, the device that uses the MFP network ID 300 as the identifier therefor is not the MFP 10 but the extension phone set 1. Thus, the party device with which the mobile device 4 performs data communication is switched from the MFP 10 (the wireless communication 213) to the extension phone set 1 (wireless communication 214). Further, the party device with which the AP 51 performs data communication is switched from the MFP 10 (the wireless communication 221) to the extension phone set 1 (wireless communication 222).

As described above, in the second communication state (see FIG. 8), the WPAN 201a is formed by the extension phone set 1. Then, the wireless communication 214 of the data signal is performed between the extension phone set 1 and the mobile device 4. Further, the wireless communication 222 of the data signal is performed between the extension phone set 1 and the AP 51. Hence, the mobile device 4 can access the Internet 53 via the extension phone set 1 and the AP 51. Thereby, in the second communication state, it is possible to form the WPAN without using the wireless communication control circuit 11, and thus stop supplying the electric power to the wireless communication control circuit 11.

Further, the MFP 10 has settable operation modes such as a power-off mode and a sleep mode, in addition to a normal operation mode. The power-off mode is made effective by pressing a power on/off button of the operation unit 22. When the power-off mode is made effective, only minimum necessary functions of the MFP 10 work, and such a state is maintained until the MFP 10 is again powered on. Therefore, in the power-off mode, it is impossible to perform a printing operation or a facsimile receiving operation. Further, the sleep mode is automatically made effective after a user-set standby time has elapsed while the MFP 10 is awaiting a job. In the sleep mode, a backlight of the display unit 24 is turned off to save electric power consumption. Further, in the sleep mode, the MFP 10 is in a state where the MFP 10 can be set back into the normal operation mode in response to an interruption signal. Therefore, when receiving a job for performing a printing operation or a facsimile receiving operation, the MFP 10 is automatically set back into the normal operation mode so as to execute the job. In the MFP 10 of the embodiment, electric power supply to the wireless communication control circuit 11 is interrupted in both the power-off mode and the sleep mode.

Figure 2:
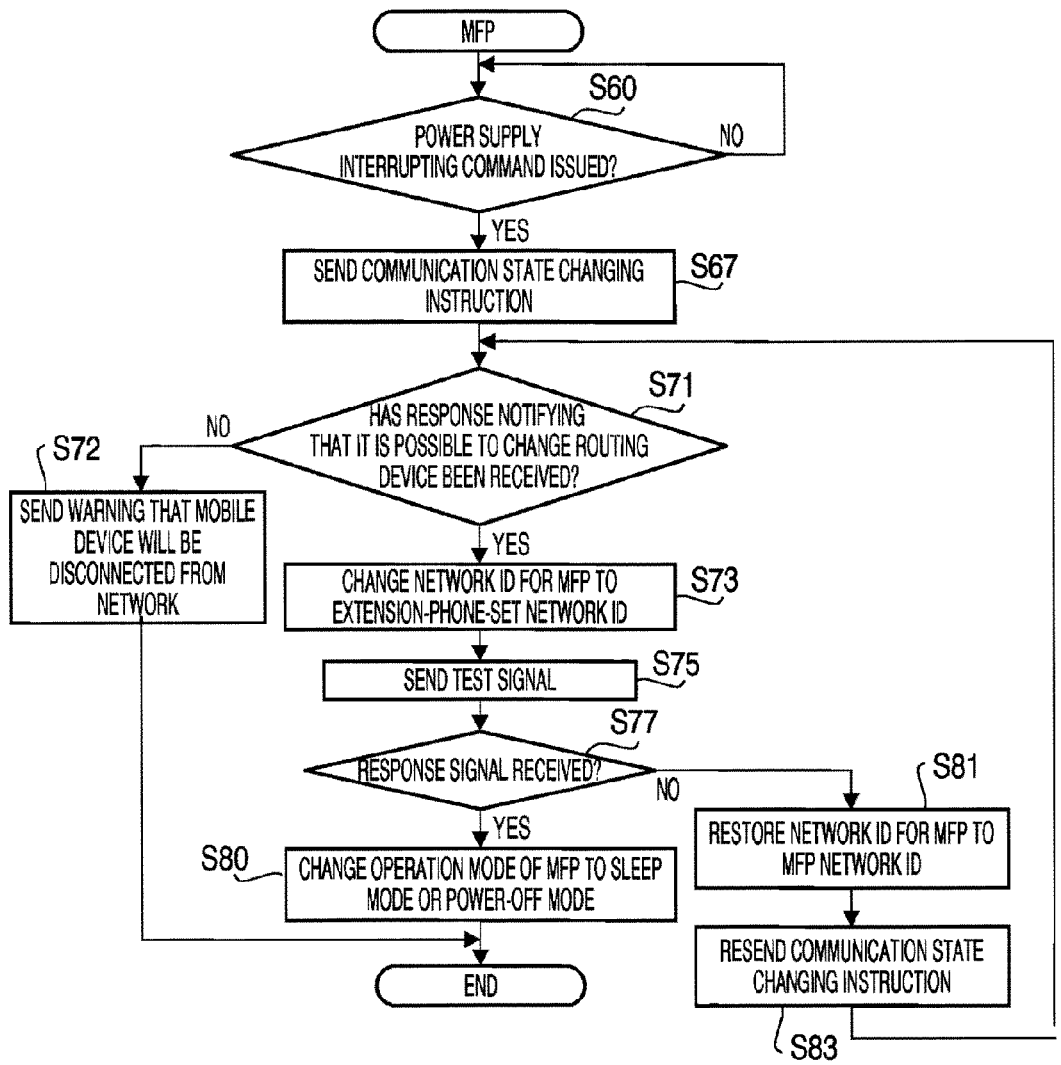
FIG. 2 is a flowchart showing a procedure of an operation mode changing process to be executed by a multi-function peripheral (MIT) of the communication system to change an operation mode of the MFP from a normal operation mode to a sleep mode or a power-off mode in the embodiment according to one or more aspects of the present invention.

An explanation will be provided about an operation mode changing process to be executed by the MFP 10 to change the operation mode of the MFP 10 from the normal operation mode to the sleep mode or the power-off mode, with reference to FIG. 2. In S60, the CPU 16 determines whether a power supply interrupting command is issued. The power supply interrupting command is a command issued in response to the MFP 10 being set into the sleep mode or the power-off mode from the normal operation mode. The MFP 10 is set into the sleep mode when the MFP 10 does not receive any job during a predetermined period of time. Further, the MFP 10 is set into the power-off mode when the user presses the power on/off button. When determining that a power supply interrupting command is not issued (S60: No), the MFP 10 goes back to S60 to wait in a standby state. Meanwhile, when determining that a power supply interrupting command is issued (S60: Yes), the MFP 10 goes to S67.

In S67, the CPU 16 sends, to the extension phone set 1, a communication state changing instruction to change the routing device from the MFP 10 to the extension phone set 1. Then, the CPU 16 goes to S71. It is noted that the communication state changing instruction may be transmitted to the extension phone set 1 with a beacon broadcasted by the wireless communication control circuit 11.

In S71, the CPU 16 determines whether the CPU 16 has received a response notifying that the extension phone set 1 can serve as the routing device in substitution for the MFP 10, When determining that the CPU 16 has not received a response notifying that the extension phone set 1 can serve as the routing device in substitution for the MFP 10 (S71: No), the CPU 16 goes to S72. In S72, the CPU 16 sends, to the mobile device 4, a warning that electric power supply to the wireless communication control circuit 11 is interrupted such that it is impossible to use the WPAN 201 or form the WPAN 201a with the extension phone set 1 as the routing device, and thus the mobile device 4 will be disconnected from the network. Then, the CPU 16 terminates the present process shown in FIG. 2.

Meanwhile, when determining that the CPU 16 has received a response notifying that the extension phone set 1 can serve as the routing device in substitution for the MFP 10 (S71: Yes), the CPU 16 goes to S73. In S73, the CPU 16 reads out an extension-phone-set network ID of an extension phone set (in the embodiment, the extension-phone-set network ID 301 of the extension phone set 1) to be used as the routing device, from the network ID storage area 40. Then, the CPU 16 replaces the MFP network ID 300 stored in the network setting storage area 41 with the extension-phone-set network ID 301 read out. Thereby; the communication state is switched from the first communication state (see FIG. 7) to the second communication state (see FIG. 8). As described, above, in response to electric power supply to the wireless communication control circuit 11 of the MFP 10 being interrupted, it is possible to switch the communication state from the first communication state to the second communication state.

In S75, the CPU 16 sends a simple test signal to the extension phone set 1. As an example of the test signal, a Ping, signal is cited.

In S77, the CPU 16 determines whether the CPU 16 has received a response signal to the test signal from the extension phone set 1 within a predetermined period of time. When determining that the CPU 16 has not received a response signal to the test signal from the extension phone set 1 within the predetermined period of time (S77: No), the CPU 16 goes to S81 based on the determination that the transmission/reception test is unsuccessful due to an abnormal communication condition in the second communication state. In S81, the CPU 16 changes the extension-phone-set network ID 301 stored in the network setting storage area 41 back to the MFP network ID 300. Namely, the communication state is restored to the first communication state from the second communication state. In S83, the CPU 16 resends the communication state changing instruction to the extension phone set 1. Then, the CPU 16 goes hack to S71.

Meanwhile, in S77, when determining that the CPU 16 has received a response signal to the test signal from the extension phone set 1 within the predetermined period of time (S77: No), the CPU 16 determines that the communication is normally performed in the second communication state, and goes to S80, in which the CPU 16 sets the MFP 10 into the sleep mode or the power-off mode. Further, the CPU 16 interrupts electric power supply to the wireless communication control circuit 11. After that, the CPU 16 terminates the present process shown in FIG. 2.

Figure 4:
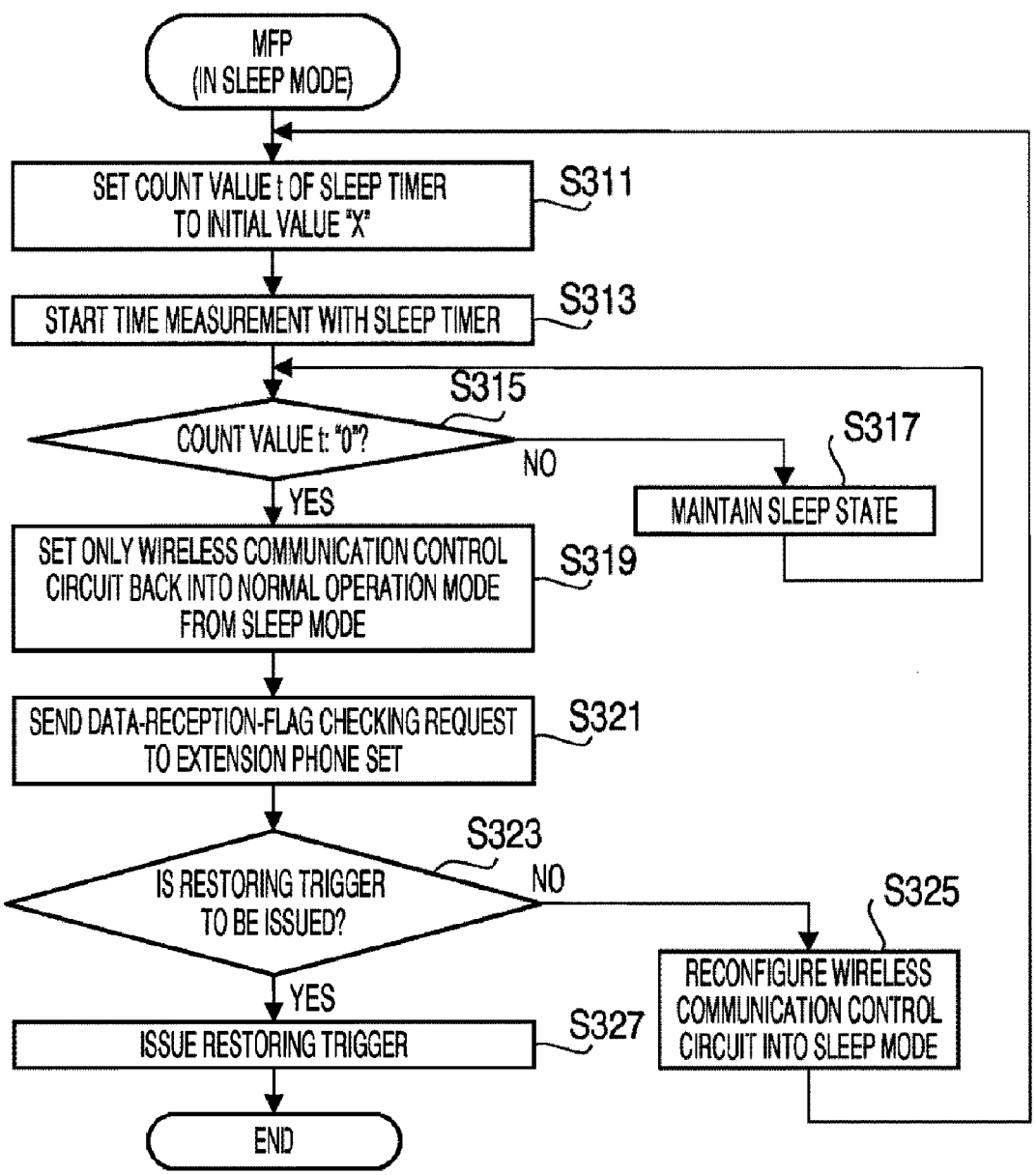
FIG. 4 is a flowchart showing a procedure of a data reception checking process to be executed by the MFP in the embodiment according to one or more aspects of the present invention.

An explanation will be provided about a data reception checking process to be executed by the MFP 10, with reference to FIG. 4. The data reception checking process shown in FIG. 4 is launched in response to the MFP 10 being set into the sleep mode. In S311, the CPU 16 sets a count value t of the sleep timer to an initial count value "X." The initial count value "X" may be set previously by the user. In S313, the CPU 16 starts time measurement with the sleep timer. In other words, the count value t begins to be counted down from the initial count value "X," In S315, the CPU 16 determines whether the count value t reaches "0." When determining that the count value t does not reach "0" (S315: No), the CPU 16 maintains a sleep state (S317) and goes back to S315. Meanwhile, when determining that the count value t reaches "0" (S315: Yes), the CPU 16 goes to S319.

In S319, the CPU 16 resumes the electric power supply to the wireless communication control circuit 11 so as to set only the wireless communication control circuit 11 back into the normal operation mode from the sleep inode. In S321, the CPU 16 sends a data-reception-flag checking request to the extension phone set 1, using the wireless communication control circuit 11. The data-reception-flag checking request is a request for transmission of a data reception flag to the MFP 10. The data reception flag is information indicating whether deposit data is stored in the storage unit 82 of the extension phone set 1. The status (value) "1" of the data reception flag denotes that the deposit data is stored. Meanwhile, the status "0" of the data reception flag denotes that the deposit data is not stored.

In S323, the CPU 16 determines whether to issue a restoring trigger. The restoring trigger is a signal to be issued when an electric power supply resuming condition for resuming the electric power supply to the wireless communication control circuit 11 is satisfied. As an example case where the electric power supply resuming condition is satisfied, cited is a case where the data reception flag transmitted by the extension phone set 1 has the status "1" and deposit data stored in the extension phone set 1 is detected. Further, cited is a case where the power on/off button of the MFP 10 is set on and a booting command is issued. When determining that the restoring trigger is not to be issued (S323: No), the CPU 16 goes to S325, in which the CPU 16 interrupts the electric power supply to the wireless communication control circuit 11 and reconfigures the wireless communication control circuit 11 into the sleep mode. Thereafter, the CPU 16 goes back to S311. Meanwhile, when determining that the restoring trigger is to be issued (S323: Yes), the CPU 16 goes to S327 and there issues the restoring trigger. After that, the CPU 16 terminates the present process shown in FIG. 4.

Figure 3:
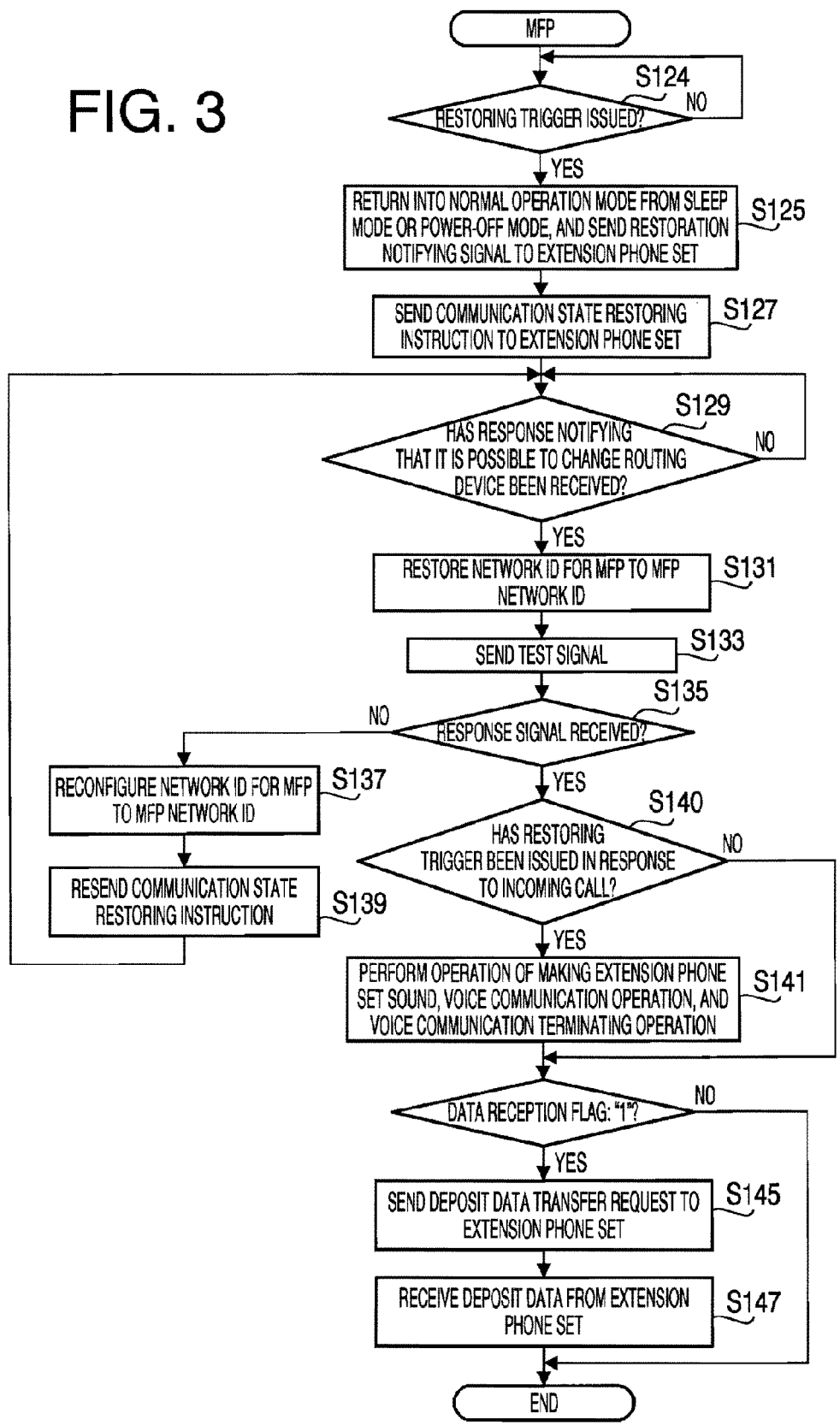
FIG. 3 is a flowchart showing a procedure of an operation mode changing process to be executed by the MFP to change the operation mode of the MFP from the sleep mode or the power-off mode to the normal operation mode to in the embodiment according to one or more aspects of the present invention.

An explanation will be provided about an operation mode changing process to be executed by the MFP 10 to change the operation mode of the MFP 10 from the sleep mode or the power-off mode to the normal operation mode, with reference to FIG. 3, In S124, the CPU 16 determines whether the restoring trigger has been issued. When determining that the restoring trigger has not been issued (S124: No), the CPU 16 goes back to S124 to wait in a standby state. Meanwhile, when determining that the restoring trigger has been issued (S124: Yes), the CPU 16 advances to S125, In S125, the CPU 16 restores the operation mode of the MFP 10 to the normal operation mode from the sleep mode or the power-off mode. In addition, the CPU 16 resumes the electric power supply to the wireless communication control circuit 11. Then, the CPU 16 sends a restoration notifying signal to the extension phone set 1.

In S127, the CPU 16 sends, to the extension phone set 1, a communication state restoring instruction to restore the routing device to the MFP 10. For instance, the communication state restoring instruction may be transmitted with a beacon broadcasted by the wireless communication control circuit 11. Thereby, in response to the electric power supply to the wireless communication control circuit 11 being resumed, it is possible to restore the routing device to the MFP 10 from the extension phone set 1.

In S129, the CPU 16 determines whether the CPU 16 has received a response notifying that it is possible to change the routing device, from the extension phone set 1. When determining that the CPU 16 has not received a response notifying that it is possible to change the routing device, from the extension phone set 1 (S129: No), the CPU 16 goes back to S129 to wait in a standby state. Meanwhile, when determining that the CPU 16 has received a response notifying that it is possible to change the routing device, from the extension phone set 1 (S1.29: Yes), the CPU 16 goes to S131. In S131, the CPU 16 reads out the MFP network ID 300 from the network ID storage area 40. Then, the CPU 16 changes the extension-phone-set network ID 301 stored in the network setting storage area 41 to the MFP network ID 300.

In S133, the CPU 16 sends a test signal to the extension phone set 1. In S135, the CPU 16 determines whether the CPU 16 has received a response signal from the extension phone set 1 within a predetermined period of time. When determining that the CPU 16 has not received a response signal from the extension phone set 1 within the predetermined period of time (S135: No), the CPU 16 goes to S137. In S137, the CPU 16 again stores the MFP network ID 300 into the network setting storage area 41. In S139, the CPU 16 resends the communication state restoring instruction to the extension phone set 1. Then, the CPU 16 goes back to S129.

Meanwhile, when determining that the CPU 16 has received a response signal from the extension phone set 1 within the predetermined period of time (S135: Yes), the CPU 16 goes to S140. In S140, the CPU 16 determines whether the restoring trigger has been issued in response to an incoming call from the telephone line network 100. When determining that the restoring trigger has not been issued in response to an incoming call from the telephone line network 100 (S140: No), the CPU 16 goes to S143 without executing S141. Meanwhile, when determining that the restoring trigger has been issued in response to an incoming call from the telephone line network 100 (S140: Yes), the CPU 16 goes to S141. In S141, the CPU 16 performs an operation of making the extension phone set 1 sound, a voice communication operation using the extension phone set 1 and voice communication terminating operation.

In S143, the CPU 16 determines whether the data reception flag is set to the status "1." When determines that the data reception flag is set to the status "0" (S143: No), the CPU 16 terminates the present process shown in FIG. 3. Meanwhile, when determining that the data reception flag is set to the status "1," (S143: Yes), the CPU 16 goes to S145. In S145, the CPU 16 sends a deposit data transfer request to the extension phone set 1 that is set as the routing device. In S147, in response to receiving, from the extension phone set 1, a response notifying that it is possible to transfer the deposit data, the CPU 16 receives the deposit data from the extension phone set 1. Then, the CPU 16 terminates the present process shown in FIG. 3.

Figure 5:
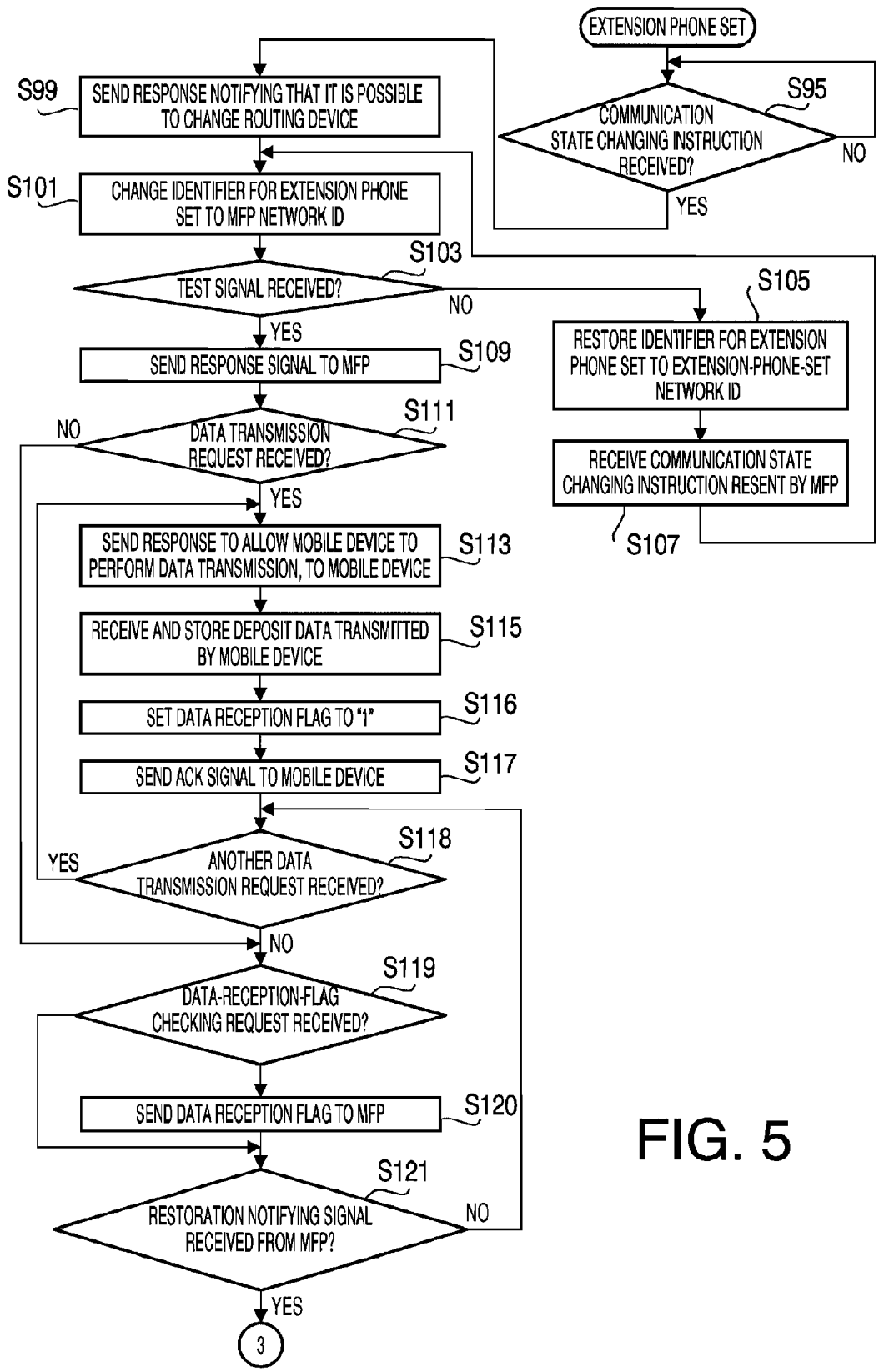
FIGS. 5 and 6 are flowcharts showing a procedure of a communication state switching process to be executed by an extension phone set to switch a communication state between a first communication state and a second communication state in the embodiment according to one or more aspects of the present invention.
Figure 6:
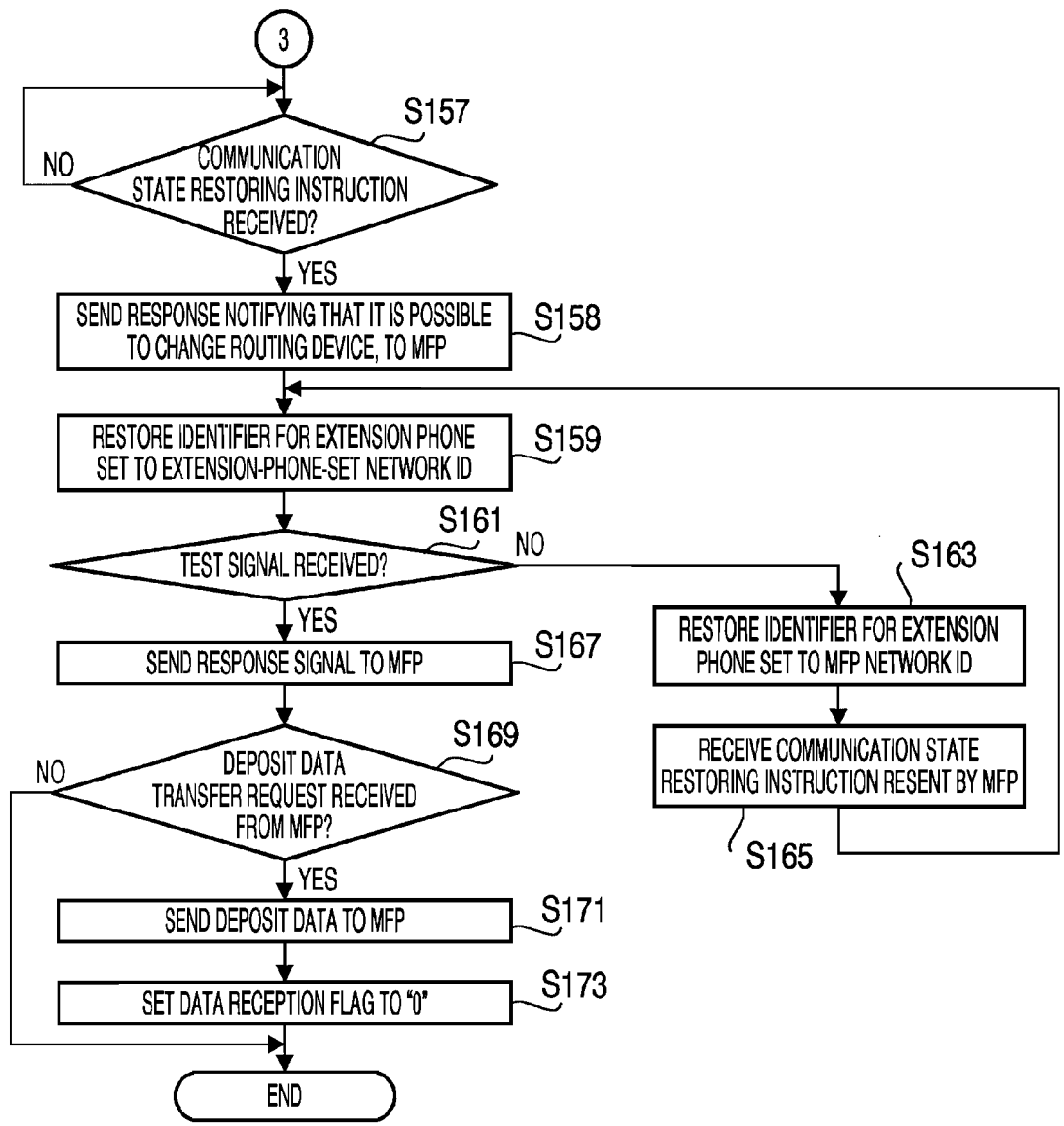

An explanation will be provided about a communication state switching process to be executed by the extension phone set 1 to switch the communication state between the first communication state and the second communication state, with reference to FIGS. 5 and 6. In S95, the CPU 76 determines whether the CPU 76 has received the communication state changing instruction from the MFP 10. When determining that the CPU 76 has not received the communication state changing instruction from the MFP 10 (S95: No), the CPU 76 goes back to S95 to wait in a standby state. Meanwhile, when determining that the CPU 76 has received the communication state changing instruction from the MFP 10 (S95: Yes), the CPU 76 goes to S99.

In S99, the CPU 76 sends, to the MFP 10, a response notifying that the extension phone set 1 can serve as the routing device in substitution for the MFP 10, In S101, the CPU 76 stores, into the network setting storage area 85, the MFP network ID 300 read out of the network ID storage area 84, In other words, the identifier for the extension phone set 1 is changed to the MFP network ID 300.

In S103, the CPU 76 determines whether the CPU 76 has received a test signal from the MFP 10 within a predetermined period of time, When determining that the CPU 76 has not received a test signal from the MFP 10 within the predetermined period of time (S103: No), the CPU 76 goes to S105. In S105, the CPU 76 restores the identifier for the extension phone set 1 to the extension-phone-set network ID 301. Further, in S105, the CPU 76 does not send a response signal to the test signal, to the MFP 10. Thereby, the CPU 76 notifies the MFP 10 that the CPU 76 has not received a test signal, in S107, when receiving the communication state changing instruction transmitted by the MFP 10, the CPU 76 goes back to S101.

Meanwhile, in S103, when determining that the CPU 76 has received a test signal from the MIT 10 within the predetermined period of time (S103: Yes), the CPU 76 goes to S109 based on the determination that the communication state has normally been changed to the second communication state, In S109, the CPU 76 sends a response signal to the MFP 10.

In S111, the CPU 76 determines whether the CPU 76 has received a data transmission request from the mobile device 4. The data transmission request is a request to inquire about whether the mobile device 4 can send various kinds of data such as print data. In the second communication state, the MFP network ID 300 is used as the identifier for the extension phone set 1. Therefore, even though the mobile device 4 recognizes that the mobile device. 4 has sent the data transmission request to the MFP 10, the data transmission request has actually been transmitted to the extension phone set 1, Further, as an example of the data sent by the mobile device 4, cited is print data based on which the printing unit 26 performs a printing operation. Meanwhile, when determining that the CPU 76 has received a data transmission request from the mobile device 4 (S111: Yes), the CPU 76 goes to S113.

In S113, the CPU 76 sends, to the mobile device 4, a response to allow the mobile device 4 to perform data transmission. In S115, the CPU 76 receives data transmitted by the mobile device 4 via the wireless communication 214, and stores the received data into the storage unit 82 as deposit data. Thereby, during a period in which the communication state is set to the second communication state, the extension phone set 1 can receive the data transmitted by the mobile device 4 to the MFP 10, in substitution for the extension phone set 1.

In S116, the CPU 76 sets the data reception flag stored in the setting storage area 83 to "1." In S117, when having completely received the data from the mobile device 4, the CPU 76 sends an ACK signal to the mobile device 4. In S118, the CPU 76 determines whether the CPU 76 has received another data transmission request from the mobile device 4. When determining that the CPU 76 has received another data transmission request from the mobile device 4 (S118: Yes), the CPU 76 goes back to S113. Meanwhile, when determining that the CPU 76 has not received another data transmission request front the mobile device 4 (S118: No), the CPU 76 goes to S119. In S119, the CPU 76 determines whether the CPU 76 has received a data-reception-flag checking request from the MFP 10. When determining that the CPU 76 has not received a data-reception-flag checking request from the MFP 10 (S119: No), the CPU 76 goes to S121 without executing S120. Meanwhile, when determining that the CPU 76 has received a data-reception-flag checking request from the MFP 10 (S119: Yes), the CPU 76 goes to S120, in which the CPU 76 sends the data reception flag to the MFP 10. In S121, the CPU 76 determines whether the CPU 76 has received a restoration notifying signal from the MFP 10. When determining that the CPU 76 has not received a restoration notifying signal from the MFP 10 (S121: No), the CPU 76 goes back to S118. Meanwhile, when determining that the CPU 76 has received a restoration notifying signal from the MFP 10 (S121: Yes), the CPU 76 goes to S157 (see FIG. 6).

In S157, the CPU 76 determines whether the CPU 76 has received the communication state restoring instruction from the MFP 10. When determining that the CPU 76 has not received the communication state restoring instruction from the MFP 10 (S157: No), the CPU 76 ales back to S157 to wait in a standby state. Meanwhile, when determining that the CPU 76 has received the communication state restoring instruction from the MFP 10 (S157: Yes), the CPU 76 goes to S158. In S158, the CPU 76 sends, to the MFP 10, a response notifying that it is possible to restore the routing device to the MFP 10 from the extension phone device 1. In S159, the CPU 76 stores, into the network setting storage area 85, the extension-phone-set network ID 301 read out of the network ID storage area 84. Thereby, the identifier for the extension phone set 1 is restored to the extension-phone-set network ID 301.

In S161, the CPU 76 determines whether the CPU 76 has received a test signal from the MFP 10 within a predetermined period of time. When determining that the CPU 76 has not received a test signal from the MFP 10 within the predetermined period of time (S161: No), the CPU 76 goes to S163. In S163, the CPU 76 replaces the extension-phone-set network ID 301 stored in the network setting storage area 85 with the MFP network ID 300. Therefore, the identifier for the extension phone set 1 is changed to the MFP network ID 300. In S165, the CPU 76 receives the communication state restoring instruction resent by the MFP 10. Thereafter, the CPU 76 goes back to S159.

Meanwhile, when determining that the CPU 76 has received a test signal from the MFP 10 within the predetermined period of time (S161: Yes), the CPU 76 determines that the communication state has normally been restored to the first communication state, and goes to S167. In S167, the CPU 76 sends a response signal to the MFP 10.

In S169, the CPU 76 determines whether the CPU 76 has received, the deposit data transfer request from the MFP 10. When determining that the CPU 76 has not received the deposit data transfer request from the MFP 10 (S169: No), the CPU 76 terminates the present process shown in FIGS. 5 and 6. Meanwhile, when determining that the CPU 76 has received the deposit data transfer request from the MFP 10 (S169: Yes), the CPU 76 goes to S171. In S171, the CPU 76 sends, to the MFP 10, the deposit data stored in the storage unit 82. In S173, the CPU 76 sets the data reception flag stored in the setting storage area 83 to "0." Then, the CPU 76 terminates the present process shown in FIGS. 5 and 6.

An explanation will be provided about a specific example of operations of the communication system 5 in the embodiment, with reference to FIGS. 9 and 10. The following example is based on an assumption that the MFP 10 is set into the sleep mode, and during a period in which the MFP 10 is in the sleep mode, data is transmitted by the mobile device 4.

In response to the MFP accepting no job during a predetermine period of time, the MFP 10 is set into the sleep mode, and the power supply interrupting command is issued (S60). Then, the MFP 10 sends, to the extension phone set 1, the communication state changing instruction to change the routing device from the MFP 10 to the extension phone set 1 (S67).

When receiving the communication state changing instruction (S95: Yes), the extension phone set 1 sends, to the MFP 10, a response notifying that it is possible to change the routing device (S99). Further, the extension phone set 1 changes the identifier therefor from the extension-phone-set network ID 301 to the MFP network ID 300 (S101).

When receiving the response notifying that it is possible to change the routing device from the extension phone set 1 (S71: Yes), the MFP 10 changes the identifier therefor from the MFP network 300 to the extension-phone-set ID 301 (S73). Thereby, the communication state is switched from the first communication state (see FIG. 7) to the second communication state (see FIG. 8).

The MFP 10 sends a test signal to the extension phone set 1 (S75). When receiving the test signal within a predetermined period of time (S103: Yes), the extension phone set 1 sends a response signal to the MFP 10 (S109). When receiving the response signal from the extension phone set 1 within a predetermined period of time (S77: Yes), the MFP 10 interrupts the electric power supply to the wireless communication control circuit 11 so as to set the MFP 10 into the sleep mode (S80).

When receiving the data transmission request from the mobile device 4 (S111: Yes), the extension phone set 1 sends, to the mobile device 4, a response to allow the mobile device 4 to perform data transmission (S113): Then, the extension phone set 1 receives data transmitted by the mobile device 4 and holds the received data as deposit data (S115). Further, the extension phone set 1 sets the data reception flag to "1" (S116), and sends an ACK signal to the mobile device 4 (S117).

Each time the count value t of the sleep timer reaches "0" in the sleep mode (S315: Yes), the MEP 10 makes only the wireless communication control circuit 11 return into the normal operation mode from the sleep mode (S319). Then, the MFP 10 sends the data-reception-flag checking request to the extension phone set 1 to check the value of the data reception flag of the extension phone set 1 (S321). When detecting the value "1" of the data reception flag (S323: Yes), the MFP 10 issues the restoring trigger (S327).

When the restoring trigger is issued (S124: Yes), the MFP 10 restores the operation mode thereof to the normal operation mode from the sleep mode, and sends a restoration notifying signal to the extension phone set 1 (S125). Further, the MFP 10 sends the communication state restoring instruction to the extension phone set 1 (S127):

When receiving the restoration notifying signal and the communication state restoring instruction (S121: Yes, and S157: Yes), the extension phone set 1 sends, to the MFP 10, a response notifying that it is possible to change the routing device (S158): Further, the extension phone set 1 restores the identifier therefor to the extension-phone-set network ID 301 from the MFP network ID 300 (S159).

When receiving the response notifying that it is possible to change the routing device from the extension phone set 1 (S129: Yes), the MFP 10 restores the identifier therefor to the MFP network ID 300 from the extension-phone-set network ID 301 (S131). Thereby, the communication state is switched from the second communication state (see FIG. 8) to the first communication state (see FIG. 7).

The MFP 10 sends a test signal to the extension phone set 1 (S133). When receiving the test signal within a predetermined period of time (S161: Yes), the extension phone set 1 sends a response signal to the MFP 10 (S167). When receiving the response signal from the extension phone set 1 within a predetermined period of time (S135: Yes), the MFP 10 determines that the restoring trigger has not been issued in response to an incoming call from the telephone line network 100 (S140: No), and checks the value of the data reception flag (S143). When determining that the data reception flag has the value "1" (S143: Yes), the MFP 10 sends the deposit data transfer request to the extension phone set 1 (S145). When receiving the deposit data transfer request (S169: Yes), the extension phone set 1 transmits the deposit data to the MFP 10 (S171), and sets the data reception flag to "0" (S173). The MFP 10 receives the deposit data from the extension phone set 1 (S147). This is the end of the operations of the communication system 5.

The communication system 5 of the embodiment provides the following effects. In the communication system 5 of the embodiment, when the MFP 10 is set into the power-off mode or the sleep mode, the electric power supply to the wireless communication control circuit 11 is interrupted such that the communication state is switched from the first communication state to the second communication state. When the communication state is changed into the second communication state, the party device with which the mobile device 4 is to communicate is switched from the MFP 10 to the extension phone set 1. At this time, the mobile device 4 can maintain the connection with the Internet 53 via the extension phone set 1 and the AP 51. Thereby, it is possible to interrupt the electric power supply to the wireless communication control circuit 11 of the MFP 10 while maintaining the wireless connection for the mobile device 4. Thus, it is possible to adequately save electric power consumption of the MFP 10 in the power-off mode or the sleep mode.

In the communication system 5 of the embodiment, during the period in which the communication state is set to the second communication state, the extension phone set 1 receives and holds data transmitted by the mobile device 4, in substitution for the MFP 10. In response to the communication state being restored to the first communication state, the extension phone set 1 sends the held data to the MFP 10. Thereby, it is possible to prevent the mobile device 4 from repeatedly resending the data in vain due to a transmission error that the data is not received by any device.

Further, the MFP 10 of the embodiment can periodically monitor whether the extension phone set 1 holds the deposit data received from the mobile device 4, during the period in which the MFP 10 is set in the sleep mode. When detecting the deposit data held by the extension phone set 1, the MFP 10 receives the deposit data from the extension phone set 1 and uses the deposit data to execute a job such as a print job. Thereby, it is possible to avoid an undesired situation where the extension phone set 1 has to store such a large amount of deposit data as to exceed a capacity of the storage unit 82. Further, it is possible to shorten a period between a time when the mobile device 4 transmits data of a job and a time when the MFP 10 begins to execute the job. Thus, it is possible to avoid an undesired situation where the user is kept waiting for a long time until the MFP 10 begins to execute the job.

Further, the communication system 5 of the embodiment needs not provide the mobile device 4 with information such as a notification that the party device of the mobile device 4 is to be changed, and information on a new party device of the mobile device 4 and a moment when the party device of the mobile device 4 is to be changed, in switching between the first communication state and the second communication state. Therefore, the communication system 5 is not required to make the mobile device 4 perform a special process for switching the communication state. Hence, it is possible to simplify switching control for switching the communication state. Thereby, it is possible to avoid undesired situations such as a situation where a long period of time is needed to switch the communication state and a situation where a load placed on the communication system 5 is increased.

Further, in the communication system 5 of the embodiment, it is possible to detect a situation where the communication state cannot be switched to the second communication state, by employing a test signal. Moreover, the communication system 5 applies a fail-safe design to restore the communication state to the first communication state when there is a trouble caused in the second communication state. Thereby, it is possible to ensure reliability of the communication system 5.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

The device that transmits the data transmission request in S111 (see FIG. 5) is not limited to the mobile device 4. Any device connected with the communication system 5 may transmit the data transmission request. For instance, the PC 52 may transmit the data transmission request.

In each of the network ID storage area 10 of the MFP 10 and the network ID storage area 84 of the extension phone set 1, the MFP network ID 300 and the extension-phone-set network ID 301 are stored. A moment, when the MFP network ID 300 and the extension-phone-set network ID 301 are stored into each of the network. ID storage area 40 and the network ID storage area 84, may be a moment before or at the time of shipping of a set of the MFP 10 and the extension phone set 1. Alternatively, the moment may be a moment when an extension phone set is additionally connected to the communication system 5.

Further, the MFP 10 may be configured with a communication unit and a multi-function unit that are physically separated from one another. The communication unit may include elements of the MFP 10 that are required to control communication using the telephone line network 100. The multi-function unit 10 may includes elements of the MIT 10 that are required to achieve multiple functions such as a scanning function and a printing function, other than the elements of the communication unit. In this case, the WPAN 201 and the WLAN 202 may be established by the communication unit.

In addition, the communication unit and the multi-function unit may be configured to communicate with each other via the WLAN 202. Thereby, it is possible to form a dispersed multi-function peripheral with the communication unit and the multi-function unit. Thus, since a connector of the telephone line network 100 is not required to be connected directly with a large-volume MFP 10, it is possible to lay out the MFP 10 in a more appropriate manner and enhance user-friendliness.

What is claimed is:

1. A communication system comprising:
   a communication device having a power management functionality and configured to connect with a communication line; and
   a phone device, the communication system configured to connect the communication device and the phone device with each other via wireless communication,
   wherein the communication device comprises:
      a wireless communication unit configured to wirelessly perform data communication and voice communication with an external device and the phone device; and
      a communication-device storage unit configured to store a communication-device network ID for identifying the communication device and a phone-device network ID for identifying the phone device,
   wherein the phone device comprises a phone-device storage unit configured to store the phone-device network ID and the communication-device network ID,
   wherein the communication system is configured to switch a communication state thereof from a first communication state, in which the wireless communication unit performs both data communication and voice communication with the external device and the phone device, to a second communication state, in which the data communication is performed between the phone device and the external device, by changing settings of the communication-device network ID and the phone device network ID stored in the communication-device storage unit and the phone-device storage unit in response to an electric power supply to the wireless communication unit being interrupted,
   wherein the first communication state is set when the communication-device network ID is used for the communication device, such that the communication device is identified as the communication device on the communication system, and the phone-device network ID is used for the phone device, such that the phone device is identified as the phone device on the communication system, and
   wherein the second communication state is set when the phone-device network ID is used for the communication device, such that the communication device is identified as the phone device on the communication system, and the communication-device network ID is used for the phone device, such that the phone device is identified as the communication device on the communication system.

2. The communication system according to claim 1,
   wherein the communication device further comprises a communication-device controller configured to control the communication device,
   wherein the phone device further comprises a phone-device controller configured to control the phone device,
   wherein the communication-device controller is configured to, in response to acceptance of an interrupting command for interrupting the electric power supply to the wireless communication unit, send a communication state changing instruction to the phone device, read out the phone-device network ID from the communication-device storage unit, and use the phone-device network ID for the communication device such that the communication device is identified as the phone device on the communication system, and wherein the phone-device controller is configured to, in response to receipt of the communication state changing instruction, read out the communication-device network ID from the phone-device storage unit, and use the communication-device network ID for the phone device such that the phone device is identified as the communication device on the communication system.

3. The communication system according to claim 2, wherein the communication-device controller is configured to, in response to detecting that a resuming condition for resuming the electric power supply to the wireless communication unit is satisfied, send a communication state restoring instruction to the phone device, read out the communication-device network ID from the communication-device storage unit, and use the communication-device ID for the communication device such that the communication device is identified as the communication device on the communication system, and wherein the phone-device controller is configured to, in response to receipt of the communication state restoring instruction, read out the phone-device network ID from the phone-device storage unit, and use the phone-device network ID for the phone device such that the phone device is identified as the phone device on the communication system.

4. The communication system according to claim 3, wherein the phone-device controller is configured to, during a period in which the communication system is in the second communication state, control the phone device to receive data that is transmitted by the external device to a device identified with the communication-device network ID, and store the data received from the external device, into the phone-device storage unit, and wherein the phone-device controller is configured to, in response to receipt of the communication state restoring instruction, send the data stored in the phone-device storage unit, to the communication device.

5. The communication system according to claim 4, wherein after a lapse of a predetermined time during the period in which the communication system is in the second communication state, the communication-device controller resumes the electric power supply to the wireless communication unit, and inquires of the phone device whether the data is held in the phone-device storage unit, wherein when receiving a notification that the data is held in the phone-device storage unit from the phone device, the communication-device controller sends the communication state restoring instruction to the phone device, reads out the communication-device network ID from the communication-device storage unit, uses the communication-device network ID for the communication device, and receives the data from the phone device.

6. The communication system according to claim 3, wherein the resuming condition is satisfied in one of a case where the communication device receives an incoming call from the communication line and a case where the communication device accepts a booting command for booting the communication device.

7. The communication system according to claim 2, wherein the communication-device controller is configured to, after using the phone-device network ID for the communication device, send a test signal to a device identified with the communication-device network ID, wherein the phone-device controller is configured to, when not receiving the test signal, provide the communication device with a notification that the phone-device controller does not receive the test signal, and use the phone-device network ID for the phone device, and wherein the communication-device controller is configured to, in response to receipt of the notification that the phone-device controller does not receive the test signal, use the communication-device network ID for the communication device.

8. A communication device having a power management functionality and configured to connect with a communication line and wirelessly communicate with a phone device, the communication device comprising:

a wireless communication unit configured to wirelessly perform data communication and voice communication with an external device and the phone device;

a communication-device storage unit configured to store a communication-device network ID for identifying the communication device and a phone-device network ID for identifying the phone device; and a communication-device controller configured to selectively set one of the communication-device network ID and the phone-device network ID as a network ID for the communication device, wherein the communication-device controller is configured to switch a communication state from a first communication state, in which the wireless communication unit performs both data communication and voice communication with the external device and the phone device, to a second communication state, in which the data communication is performed between the phone device and the external device, by changing settings of the communication-device network ID and the phone device network ID stored in the communication-device storage unit and a phone-device storage unit of the phone device in response to an electric power supply to the wireless communication unit being interrupted, wherein the first communication state is set when the communication-device controller sets the communication-device network ID as the network ID for the communication device, and wherein the second communication state is set when the communication-device controller sets the phone-device network ID as the network ID for the communication device and the wireless communication unit sends to the phone device a command for setting the communication-device network ID as the network ID for the phone device.

9. A phone device configured to wirelessly communicate with a communication device having a power management functionality and connected with a communication line, the phone device comprising:

a phone-device storage unit configured to store a phone-device network ID for identifying the phone device and a communication-device network ID for identifying the communication device; and a phone-device controller configured to selectively set one of the communication-device network ID and the first-phone-device network ID as a network ID for the phone device, wherein the phone-device controller is configured to switch a communication state from a first communication state, in which a wireless communication unit of the communication device performs both data communication and voice communication with an external device and the phone device, to a second communication state, in which the data communication is performed between the phone device and the external device, by changing settings of the communication-device network ID and the phone device network ID stored in a communication-device storage unit of the communication device and the phone-device storage unit in response to receipt of a notification that electric power supply to a wireless communication unit of the communication device is interrupted, wherein the first communication state is set when the phone-device controller sets the phone-device network ID as the network ID for the phone device, and wherein the second communication state is set when the phone-device controller sets the communication-device network ID as the network ID for the phone device.

* * * * *